United States Patent [19]

Lehr

[11] 4,181,644
[45] Jan. 1, 1980

[54] IMPACT MODIFIED POLYMER COMPOSITION

[75] Inventor: Marvin H. Lehr, Bath, Ohio

[73] Assignee: The B. F. Goodrich Company, Akron, Ohio

[21] Appl. No.: 889,458

[22] Filed: Mar. 23, 1978

[51] Int. Cl.$^2$ .................. C08K 7/14; C08L 53/00
[52] U.S. Cl. .................. 260/42.18; 525/80; 525/84; 525/96
[58] Field of Search .................. 260/876 B, 42.18

[56] References Cited

U.S. PATENT DOCUMENTS

| | | | |
|---|---|---|---|
| 3,793,406 | 2/1974 | Bortnick et al. | 260/884 |
| 3,801,529 | 4/1974 | Potter | 260/30.6 R |

OTHER PUBLICATIONS

Penn, *PVC Technology* (Wiley Interscience, 1972) pp. 161, 372.

*Primary Examiner*—J. Ziegler
*Attorney, Agent, or Firm*—James R. Lindsay

[57] ABSTRACT

Chlorinated polyvinyl chloride resin (CPVC) is blended with a block copolymer of styrene and a diene (SD) or of styrene-diene-styrene (SDS), which block copolymer is referred to as a "pro-modifier" because, by itself, it performs a dual function of processing aid and impact modifier in CPVC. For tailoring specific desirable impact properties and physical characteristics into a CPVC resin composition, it may be desirable to use a conventional impact modifier in combination with the block copolymer. When the block copolymer is so used, such use being referred to as that of a "co-modifier", the block copolymer and conventional impact modifier provide a CPVC composition with unexpectedly enhanced impact strength. The block copolymer consists essentially of a vinyl aromatic compound and a conjugated idene, such as styrene-diene (SD) diblock copolymer, or a styrene-diene-styrene (SDS) polyblock copolymer having a linear or radial block structure, or mixtures of linear and radial block copolymers. When a conventional impact modifier is used, it may be any elastomer additive, preferably a nucleated rubbery graft copolymer, but a minor quantity by weight of a synthetic resinous interpolymer which contains no rubber polymer, may also be used.

18 Claims, 2 Drawing Figures

IMPACT MODIFIED POLYMER COMPOSITION

BACKGROUND OF THE INVENTION

It is well known that a chlorinated vinyl polymer referred to as chlorinated polyvinyl chloride (CPVC) has excellent high temperature performance characteristics, among other desirable physical properties. CPVC resin is commercially available as a mixed polymeric structure of vinyl chloride, vinylidene chloride and 1,2-dichloroethylene. Typically, commercial CPVC has in excess of about 60 percent by weight (% by weight) bound chlorine, and is most conveniently prepared by the chlorination of polyvinyl chloride as described in U.S. Pat. Nos. 2,996,489; 3,100,762; 3,334,077; 3,334,078; 3,506,637; and 3,534,013 inter alia. The term CPVC is used herein to define a chlorinated vinyl chloride polymer having in excess of about 60% by weight bound chlorine.

A well-known undesirable characteristic of CPVC resin is that it has inherently low impact properties, a characteristic which is common to vinyl chloride homopolymers. The burgeoning demand for CPVC pipe, vessels, valve bodies and fittings of all kinds, and the fact that an impact-deficient CPVC matrix may be improved by compounding it with impact modifiers, has instigated concerted efforts to develop better impact modified CPVC compositions. Most of these efforts have been channeled towards rigid CPVC applications where acceptable impact strength is critical. Such applications include the manufacture of exterior structural products, rigid panels, pipe and conduit, injection-molded and thermoformed industrial parts, appliance housings, and various types of containers both large and small.

Impact modifiers when used in CPVC reduce the tensile strength and heat distortion temperature (HDT) of the resin, and many reduce the processing heat stability. There are very few modifiers which yield a significant increase in impact strength or improvement in processability of the CPVC resin without vitiating the quality of the resin. Most elastomeric additives such as conjugated diene homo and copolymers or acrylic polymers which reduce the brittle temperature of vinyl chloride polymers, are ineffective when present in an amount less than about 10% by weight, and if used in a greater amount than 10% adversely affect the high temperature stiffness of the resin. Elastomer additives commonly used as conventional impact modifiers are graft copolymers containing butadiene, and other copolymers including chlorinated polyethylene (CPE), ethylene-vinyl acetate copolymers (EVA), acrylate-methacrylate (all acrylic) polymers, grafted elastomers based on vinyl chloride (VCG), nitrile rubbers (BR), styrene-butadiene rubbers, and the like. These conventional impact modifiers are generally used in a substantial amount, that is, an amount sufficient to provide at least a 20% increase in Izod impact strength over a non-impact modified CPVC matrix. When any of the foregoing conventional impact moifiers, with the exception of CPE, is used, it is essential that a processing aid be blended into the CPVC composition.

A processing aid is used in melt blending a resin composition to hasten fusion, to smooth out the otherwise rough texture of the composition and to soften the resin so that it is uniformly melt-blended within an acceptably short time. Easily melt-blended materials such as acrylonitrile-butadiene-styrene resins do not require a processing aid. Commercial polyvinyl chloride (PVC) is conventionally milled with a processing aid, though it can be melt-blended without one; but commercially chlorinated polyvinyl chloride (CPVC) has a high melt elasticity and therefore requires a processing aid or it cannot be acceptably melt-blended. By "acceptably melt-blended" I refer to the requirement that CPVC must be melt-blended within a relatively short time, usually no more than 2 or 3 minutes, and desirably less than 2 mins. Since the fusion temperature of CPVC is relatively high, even long mixing at about 190° C. can cause evolution of HCl and consequent degradation of the resin. Of course, degradation can be postponed by adding more stabilizer, usually a liquid compound containing tin, or more processing aid, both of which are expensive. However, this is not a practical solution because it increases the cost of the blend and decreases the heat distortion temperature owing to the plasticizing effect of the stabilizer or processing aid. Processing at higher temperatures than would be required with the use of a processing aid accelerates HCl evolution, discolors the resin and results in a low quality end product. Thus, from a practical point of view, a processing aid is essential to melt-blend CPVC. Since the end use product must have desirable impact strength, from a practical point of view, an impact modifier is also essential in a CPVC composition.

To my knowledge, until this invention, CPE was unique in that it functioned as a dual function additive or modifier, functioning both as a processing aid and as an impact modifier, therefore referred to herein as a "pro-modifier". The reasons for this unique and desirable behavior of CPE are not clearly understood. Desirable as this behavior is, it is known that CPE is a more effective processing aid than impact modifier. Thus, for applications where processability is essential and some impact strength is desirable, CPE alone is used as an impact modifier, but where optimum impact is essential, CPE is generally used in combination with one or more of the above-mentioned conventional impact modifiers. Similarly, where processability is a predominant concern, ABS resins, and Cycolac (Registered U.S. Trademark) L in particular, provide improved processability although from about 10 to about 15 parts per hundred parts CPVC resin (phr) are required. PVC, vinyl chloride, vinyl chloride-vinylidene chloride copolymers and other vinyl or vinylidene chloride based polymers do not produce enough improvement in processability to offset the loss of other physical properties, particularly HDT. Acrylates such as polymethylmethacrylate (PMMA) improve processability but do not contribute an appreciable improvement in impact strength.

Of course, because conventional impact modifiers are rubbery polymers, it is evident that relatively large amounts of an impact modifier, greater than about 10% by wt of the total resinous components in the composition, will have a beneficial effect upon the processability of CPVC which, by itself, is so difficult to process. At levels lower than about 10% by wt, conventional impact modifiers exhibit little, if any, improvement in processability, and sometimes even increase the melt elasticity. Some like ethylene-propylene rubber (EPR), show incompatibility with CPVC at levels below 10% by wt.

It is reasonable to expect that a desirable pro-modifier should have certain solubility characteristics compatibly matched to CPVC. Having decided upon the solubility characteristics for a pro-modifier, finding the good ones is still a matter of laborious trial and error. With this methodical approach the SD and SDS block copolymers of this invention would have been missed, because they are not expected to have the borderline compatibility characteristics associated with what should be an effective pro-modifier.

All impact modifiers and processing aids, when conventionally used in conjunction with one and another, in whatever combination, are referred to herein as "co-modifiers". It is implicit that a conventional co-modifier, when used alone at a level below about 10 phr, does not provide either sufficiently high impact strength in excess of 2 ft-lb/in Izod impact, or desirable processability, or both, without an undue sacrifice of HDT and other desirable physical characteristics of CPVC. For example, yield stress or tensile strength generally drops off linearly with increasing concentration of co-modifier which at relatively high levels may be desirable for improving the impact strength. Since, at present, a CPVC composition with desirable, relatively high impact strength in excess of 2 ft-lb/in Izod impact, includes an impact modifier and a processing aid as co-modifiers, matching the co-modifiers for compatibility is a trial and error task which is usually as time-consuming as it is essential. Those skilled in the art, responsible for finding matched co-modifiers, have long sought, without much success, for a dual function or bifunctional modifier which will not vitiate the desirable end-use attributes of CPVC articles. This invention is the successful culmination of the long search. When used by itself in CPVC, the bifunctional block copolymer is referred to herein as a "pro-modifier" because of its dual function as processing aid and impact modifier. A styrene-butadiene-styrene (SBS) block copolymer has been used as the only impact modifier in vinyl chloride polymers, but it is difficult to blend the SBS block copolymer into the vinyl chloride polymer even with a processing aid. For example, S. N. Potepalova et al in Plast. Massy. 8,41 (1973) reported that prolonged mixing was required to get a marginal improvement in impact strength when SBS was used as the sole impact modifier in PVC. It is known, that to toughen plastic synthetic resinous materials with rubber particles dispersed therein, good adhesion must exist between the rubber particles and the plastic (see "Macromolecular Reviews" by R. P. Kambour, J. Poly. Sci. 7, 1 et seq., 1973). Evidently the requisite adhesion between SBS and PVC is lacking and there is no reason to expect this adhesion to manifest itself in any other vinyl chloride polymer. The reference makes no suggestion that SBS may be used as the sole impact modifier in any other vinyl chloride resin. Since CPVC is sometimes like PVC in its behavior towards most impact modifiers, it was unexpected that any SBS block copolymer deemed wanting in its effect on the impact properties of PVC would favorably affect the impact properties of CPVC. It is expecially surprising that a block (SBS) copolymer, and particularly a diblock (SB) copolymer, should provide a dual function of processing aid and impact modifier.

Though used as the sole pro-modifier in CPVC compositions, these block copolymers may also be used as co-modifiers in conjunction with conventional co-modifiers to produce a blended CPVC resin composition which is tailored for specific properties. When so used, that is when the block copolymers are used as co-modifiers with other co-modifiers, the block copolymers produce a synergistic boost in impact effectiveness of the other co-modifier used, without any apparent reason for doing so, provided the other co-modifiers are used in a substantial amount sufficient to produce at least a 20% increase in Izod impact strength over the impact strength of matrix without an impact modifier.

SUMMARY OF THE INVENTION

It has been discovered that a styrene-diene (SD), or styrene-diene-styrene (SDS) block copolymer performs a dual functin of processing aid and impact modifier (hereafter referred to as a "pro-modifier") in chlorinated polyvinyl chloride (CPVC).

It has further been discovered that improvement in the impact properties of CPVC due to presence of the block copolymer pro-modifier is unexpectedly better than with conventional impact modifiers and processing aids, when compared on a weight basis. Modifiers and processing aids, when used either independently or in combination with one and another are referred to herein as "co-modifiers".

It has also been discovered that a SD or SDS block copolymer, or mixture thereof, may be used in conjunction with one or more conventional impact modifiers and/or processing aids, that is, as a co-modifier to tailor the impact and processing characteristics of CPVC for any predetermined application.

It is therefore a general object of this invention to provide a novel CPVC impact resistant composition comprising (a) a chlorinated vinyl chloride polymer, and (b) a pro-modifier block copolymer, such as an SD or SDS block copolymer, optionally including additives for desirable color, stability and the like. This novel composition provides a surprisingly advantageous combination of processability, heat stability, HDT retention and impact strength.

It is a specific object of this invention to provide a rigid CPVC plastic formulation of exceptional impact resistance, which formulation is an easily melt-blended composition comprising (a) CPVC polymer having primary particles in the size range from about 2500 A (0.25$\mu$) to about 2$\mu$ (micron), and (b) an SD or SDS block copolymer pro-modifier having primary particles in the size range from about 200 A to about 1 micron.

It is another specific object of this invention to provide a rigid CPVC plastic formulation with surprising impact strength and processability coupled with low shrinkage, in which a linear block copolymer of the styrene-butadiene-styrene (SBS) type or the styrene-butadiene (SB) type, or a radial block copolymer of the SBS type with vinyl aromatic terminal blocks, may be used as a first co-modifier with at least one other second co-modifier which is independently selected from a conventional impact modifier and a processing aid for CPVC.

BRIEF DESCRIPTION OF THE DRAWINGS

The foregoing and other objects and advantages of my invention will appear more fully from the following description of preferred embodiments of the invention, some of which description is set forth in conjunction with the accompanying drawing wherein.

Figure 1:
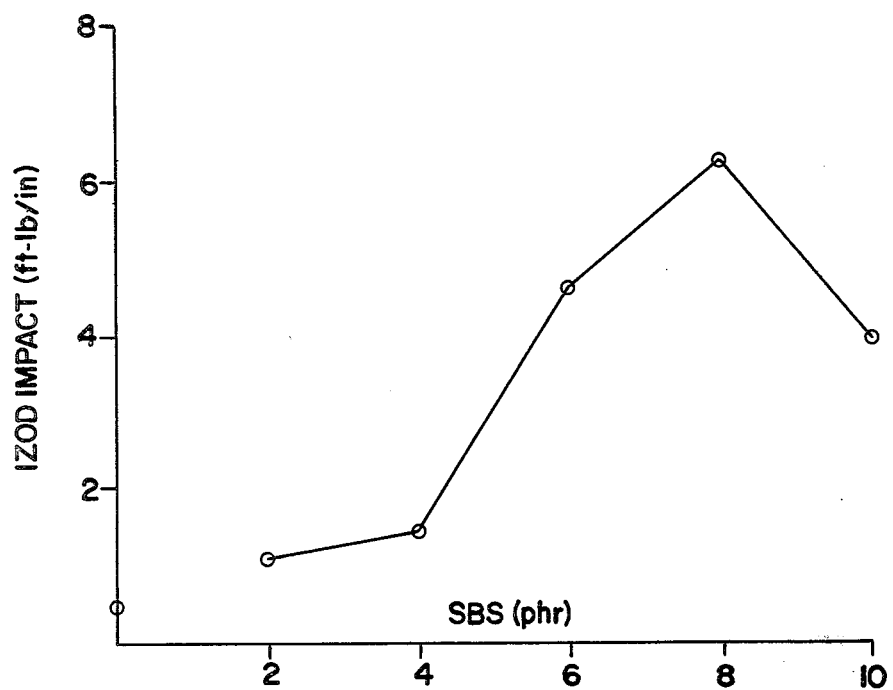
FIG. 1 graphically illustrates the effect on impact strength of SBS pro-modifier in parts per 100 parts of total resin (phr) when the SBS is melt-blended into a CPVC matrix.

All references to "the block copolymer" in this specification refer to an SD or SDS block copolymer as described in more detail in the following detailed description of preferred embodiments of the invention.

DETAILED DESCRIPTION OF PREFERRED EMBODIMENTS

In a preferred embodiment of this invention, chlorinated polyvinyl chloride (CPVC) containing at least 60% by weight bound chlorine, forms the matrix, continuous phase, continuum or major phase in which is usually blended plasticizers, antioxidants, pigments, ultraviolet light stabilizers, processing aids, impact modifiers and the like. The following description and observations and tests on illustrative examples of various CPVC recipes compounded with SD or SDS block copolymer pro-modifier as the sole modifier, or with plural co-modifiers including the block copolymer, disregards the use of all ingredients except those related to impact performance. It is expected that those skilled in the are can effectively utilize those ingredients which have no special impact-improving characteristics in conjunction with the teachings of this invention.

The impact strength of chlorinated vinyl chloride polymers generally, and CPVC in particular, in the range from about 0.5 to about 2.0 ft-lb/in is known to be approximately directly correlatable to the concentration (wt %) of rubber in the CPVC. By "rubber" I refer to the rubbery content of an elastomer impact modifier, such as, for example, the rubber content of an overpolymerized graft copolymer in which a hard resin is grafted on a rubbery center (hence referred to herein as "hard shell" resin). In general, in this range of about 0.5 to about 2.0 ft-lb/in impact strength, the higher the wt % rubber, the higher the impact strength. Typically, where more than one conventional impact modifier is used, the impact strength obtained is approximately directly correlatable to the cumulative wt % rubber content.

It is not the primary purpose of this invention to provide a rigid CPVC composition having the highest possible impact strength, but to provide desirable impact strength and ease of processing by using less conventional impact modifier and processing aid than normally used to provide preselected impact and processability values. This is made possible by replacing some, and more preferably all, of the conventional impact modifiers and processing aids with the SD or SDS block copolymer. In many instances, the use of pro-modifier alone, in an amount less than the combined weight of conventional impact modifier and processing aid, provides the same impact strength and processability.

In general, the more co-impact modifier used, the greater the impact strength, and the cost-effectiveness of a co-modifier is evaluated by comparing impact strength versus parts of co-modifier per hundred parts of vinyl chloride resin matrix.

Any comparison of co-modifiers must take into account the fact that their rubber contents vary widely. Since improved impact strength is attributable to the weight percent (wt %) rubber, and the rubber contents vary, formulations are compared at constant wt % rubber, or constant parts rubber per hundred parts resin (phr), and the total weight of resin includes CPVC, polystyrene from the SBS (say) ultra-modifier block copolymer used, and resin from grafted impact modifier.

In a first embodiment, the invention is concerned with the use of the SD or SDS linear or radial block copolymer as the only modifier, that is as a "promodifier", in commercially produced CPVC.

In a second embodiment, this invention is concerned with the use of the SD or SDS, linear or radial block copolymer conjointly with at least one other modifier, whether an impact modifier or processing aid, or both, in commercially produced CPVC. When plural modifiers are used, one of which is the block copolymer, each of the modifiers including the block copolymer is referred to as a "co-modifier", and the effect on impact strength and processability of the combined co-modifiers may be, and generally is, unexpectedly more beneficial than their individual and separate, essentially merely additive effects. In this second embodiment of this invention, where a conventional impact modifier (a first co-modifier), is used with an SD or SDS block copolymer (as a second co-modifier), an increase in impact strength is obtained which is unexpectedly greater than that obtained if the combined wt % rubber was present in the first co-modifier alone. Quite commonly a boost in impact strength is obtained with the two combined co-modifiers, despite the total wt % rubber therein being less than that necessary in a conventional impact modifier which produces comparable impact resistance. Total wt % rubber is the sum of the rubbery contents of the modifiers used, whether it be the diene content of the block copolymer, or the diene or other similar rubber content of a conventional co-modifier, in parts by weight per 100 parts by weight of CPVC composition.

There is provided in the first embodiment of this invention, an impact-modified thermoplastic composition free of conventional impact modifiers and processing aids, comprising (a) a matrix comprising a chlorinated polyvinyl chloride polymer, and (b) a block copolymer pro-modifier consisting essentially of a vinyl aromatic compound (S) and a conjugated diene (D) of the linear block, or radial block type, blocks (D) being of either lower or higher average molecular weight than those of blocks (S), component (b) being present in an amount in the range from about 1 to about 10 wt %, and preferably from about 2 to about 8 wt % of the total resinous components of the composition. Component (b) is typically melt-blended into the matrix and the CPVC blend so produced exhibits the same properties as conventionally modified CPVC blends, except that it has better processability and impact properties. The inherently excellent properties of CPVC, namely, low smoke, and low flammability, may now be obtained along with excellent impact strength and processability at lower cost than prior art CPVC blends.

In general, the processability of polymers of halogenated vinyl monomers, and particularly PVC and CPVC, is so poor that processing aids must be melt-blended into the matrix along with the impact modifier. Typically a processing aid is a random copolymer of styrene and acrylonitrile, or a copolymer of α-methyl styrene and methyl methacrylate, or polymethylmethacrylate, any one or more of which is used in an amount less than about 10% by wt, and preferably in an amount in the range from about 1% to about 5% by wt.

The precise mechanism by which the presence of a small amount of pro-modifier, less than 10% by wt, contributes to the impact strength and processability of the CPVC, is unknown, but a mechanism is hypothesized. During molten polymer blending of the pro-modifier into the CPVC matrix, a broad distribution of rubber particle sizes occurs. The pro-modifier contributes very small particles in the size range from about 200 Å to about 1000 Å (Angstrom units), as well as some larger particles in the range from 1000 Å to about 10,000 Å. In particular, during melt blending, there is agglomeration of some rubber particles which further contributes to a broad particle size distribution in the composition. Further, the glass transition temperature $T_g$ of the polybutadiene block in the block copolymer is substantially lower than the $T_g$ of conventional impact modifiers, and thus improves impact strength. Yet another factor contributing to the desirable impact and processing qualities of the pro-modified CPVC may be the inclusion of polystyrene blocks in the dispersed polybutadiene rubber particles to increase the volume of rubbery particles.

The chlorinated polyvinyl chloride polymers (CPVC) used in this invention may be chlorinated homopolymers of vinyl chloride, or copolymers of chlorinated vinyl chloride and other monomers copolymerizable therewith, and CPVC constitutes in excess of 50% by weight of the composition of this invention. More preferably, the matrix of CPVC is present in the range from about 70% to about 95% by weight of the composition, the remainder being block copolymer pro-modifier. Other additives, not uniformly distributed within the CPVC matrix, and not used primarily for impact modification or processability, are disregarded for the purpose of this invention. Examples of other monomers referred to include vinyl esters such as vinyl acetate, vinyl propionate, vinyl laurate, vinyl stearate, and the like; alpha-olefins, such as ethylene, propylene, butylene and the like; and alkyl acrylates or methacrylates having up to 18 carbon atoms in the alkyl moiety. Preferred chlorinated polymers include polyvinyl chloride, and to the extent that they can be chlorinated, chlorinated vinyl chloride/vinyl acetate copolymers, and chlorinated vinyl chloride/ethylene copolymers, the former containing from about 5 to about 20% by weight of vinyl acetate, and the latter containing from about 0.3 to about 1.9% by weight ethylene copolymerized therein. Most preferred are general purpose types of commercially available CPVC produced as particularly described in U.S. Pat. No. 2,946,489.

Block copolymers of vinyl aromatic compounds and conjugated dienes are described in Kennedy et al., (Editor) "Polymer Chemistry of Synthetic Elastomers", Interscience, Vol. 23, Part II, 1969, pages 533–559; R. Zelinski and C. W. Childers "Rubber Chemistry and Technology" Vol. 41, page 161 et seq. (1968); and "Technology" Vol. 43, page 22 et seq. (1970). The block copolymers are of the SD or SDS type in which the relative ratios of the homopolymer blocks can vary. In the compositions of this invention, the block copolymer's blocks D will always be those of a conjugated diene, e.g., butadiene, isoprene; 1,3-pentadiene; 2,3-dimethyl-butadiene, and the like or mixtures of the foregoing; and blocks S will always be derived from a vinyl aromatic compound, e.g., styrene, α-methyl styrene, vinyl toluene, vinyl xylene, vinyl naphthalene, or mixtures of any of the foregoing. In the most preferred compositions, the block copolymer pro-modifier will have blocks S comprised of polystyrene, and blocks B comprised of polybutadiene.

The pro-modifier necessarily has either a linear block or a radial teleblock structure, "teleblock" being used to designate copolymers with terminal block segments of one of the monomers used to produce them. Preferred are linear blocks having polyvinyl aromatic terminal blocks, and radial trichain and tetrachain blocks having polyvinyl aromatic terminal blocks. Of course, linear diblocks have terminal S and D blocks, and in all the SDS copolymers the terminal blocks will be vinyl aromatic, e.g., from styrene. "Radial" means a network in which the polystyrene blocks make the rubber thermoplastic (by virtue of the weight content) and association provides a network of plastic areas connected by flexible diene rubber blocks so the material has excellent mechanical properties without vulcanization. Although they are rubbery solids, the linear block and radial teleblock polymers soften and flow with heat and can be molded and extruded in the same manner as other thermoplastic materials. They can be remolded repeatedly without loss in properties. The precise structure of the block copolymer, that is, whether it is a diblock, triblock, or mixed polyblock copolymer is not critical, nor is its molecular weight, provided it is in the range specified hereinafter.

The ratio of the co-monomers can vary broadly, and the average molecular weight (mol wt) of combined blocks (D) may be either less than or greater than that of combined terminal blocks (S). It is preferred that the mol wt of combined blocks (D) be greater than the mol wt of combined blocks (S), to introduce desirable rubber into the composition. Higher rubber content is preferred if optimum impact strength is to be contributed by the pro-modifier. Thus, styrene-butadiene (SB) block copolymers are particularly useful and desirable since melt-blending and processing the components is relatively easy. Typically the average mol wt of the block copolymer is in the range from about 50,000 to about 300,000, and the average wt % of the combined vinyl aromatic terminal blocks (S) will range from about 20% to about 50%. In preferred block copolymers the aromatic compound units comprise a minor fraction by weight of the block copolymer, and the diene units the major fraction from about 60% to about 80%.

The block copolymers are made by an organolithium initiated polymerization process in hydrocarbon solution using, for example, butadiene and styrene or other diene and vinyl aromatic monomers as is described in Kennedy et al, mentioned above.

In one process, a SDS block copolymer is prepared by dissolving the conjugated diene, e.g., butadiene, in an aromatic hydrocarbon solvent, e.g., xylene, toluene, etc., and adding 0.3 to 7.5 millimoles/100 parts of monomer, of an organolithium initiator, e.g., n-butyl lithium, etc. Polymerization of the diene is completed and then the vinyl aromatic compound is added and polymerization of this is completed to form the block copolymer. The product is precipitated and deactivated, e.g., with alcohol, such as ethanol or isopropanol and purified by redissolving in hydrocarbon and reprecipitating with alcohol.

In another process, the block copolymer is formed using, e.g., a secondary or tertiary alkyl lithium compound at about 100–2,000 parts per million based on the total weight of the monomers and a polymerization temperature in the range from about 20° C. to about 65° C. For example, styrene is dissolved in cyclohexane at 32° C., and treated with 5,530 parts per million of secondary butyl lithium. After polymerization is complete, isoprene is injected and polymerization is continued at 55° C.–57° C. The product can be recovered as described above.

Monovinyl-substituted aromatic hydrocarbons and conjugated diene block copolymers are commercially available from Shell Chemical Company under the trademark KRATON. These SDS block copolymers may be prepared by anionic solution polymerization methods with organo-metallic catalysts as more fully described in U.S. Pat. No. 3,265,765, the disclosure of which is incorporated herein by reference as if fully set forth, and the Encyclopedia of Polymer Science and Technology, 15, pgs 508–530, Interscience Publishers, NYC (1971). The commonly used designations of SBS for styrene-butadiene-styrene and SIS for styrene-isoprene-styrene block copolymers, are used for brevity, in this specification.

Other commercially available SBS block copolymers are used pro-modifiers; for example, the block copolymer resins available as Solprene* rubbers, and K-resins* KRO-1 and KRO-3 from Phillips Petroleum Company, which resins are more fully disclosed in U.S. Pat. No. 3,639,517 inter alia, the disclosures of which are incorporated herein by reference as if fully set forth. KRO-1 contains about 73.6 wt percent of pure polystyrene blocks, balance polybutadiene blocks, the polybutadiene having a substantial percent of the cis-1,4-microstructure. The intrinsic viscosity in a typical sample is 0.67 dl/g (in chloroform at 25° C.). KRO-3 is a radial teleblock copolymer, like KRO-1, but the styrene content is about 75.8 wt percent and the intrinsic viscosity is slightly lower, about 0.64 dl/g. The glass transition point of the polybutadiene segments in each case is about −90° C. KRO-1 shows a bimodal molecular weight distribution by gel phase chromatography. KRO-3 has a smaller, low molecular weight peak.
*Reg. U.S. Trademark The method of forming the polymer composition is not critical, prior art blending techniques being suitable. The preferred method comprises melt blending the resinous components and additives in any of several ways, including providing the components in powder, granular, filamentous, or other convenient form, extruding the blend and chopping into pellets for molding to preselected shape by molding means conventionally used to mold normally solid thermoplastic compositions. In some instances the components of the composition may be utilized as a blend of powders which blend may be directly formed into rigid shapes, for example, by extrusion.

The importance of the boost in impact properties contributed by a relatively small amount of SDS pro-modifier generally less than 10 wt % of the resinous components of the composition, is more particularly appreciated because the boost is achieved in conjunction with surprisingly good processability. Though, as with conventional impact modifiers and processing aids, particularly a processing aid such as CPE, there is some loss of room temperature tensile properties and HDT, but this loss is more acceptable.

In the second embodiment of this invention referred to hereinabove, the CPVC matrix is conjointly modified by melt-blending with an SD or SDS block copolymer, and a conventional graft copolymer of the hard shell resin type. Preferably, a processing aid is also melt-blended into the matrix. Since the block copolymer is now used in conjunction with conventional modifiers, it is now referred to as a co-modifier, as are the conventional impact modifier and processing aid. In this embodiment, the composition comprises (a) a matrix comprising a chlorinated polyvinyl chloride polymer, (b) an SD or SDS block copolymer co-modifier described hereinabove, and (c) a conventional impact modifier, component (b) being present in an amount in the range from about 1 to about 10 wt %, and preferably from about 2 to about 8 wt % of the total resinous components of the composition, and component (c) being present in an amount in the range from about 1 to about 10 wt %, and preferably from about 2 to about 5 wt % of the total resinous components of the composition.

The contribution of the conventional impact modifier with respect to improving the impact strength is not critical. In general, when an SD or SDS block copolymer is used as a co-modifier with a conventional impact modifier such as a graft copolymer, and optionally, with a processing aid, the graft copolymer is present in the matrix in an amount sufficient to contribute substantial impact strength to the rigid CPVC. By "substantial" impact strength I refer to an increase in Izod impact strength of at least 20% over the impact strength of CPVC without an impact modifier.

In a CPVC composition including the block copolymer and another co-modifier, a synergistic effect is obtained as evidenced by an unexpected boost in impact strength of the melt-blended composition. Though the mechanism by which such a boost in impact strength is obtained is not clearly understood, it is hypothesized that the block copolymer produces, during melt-blending, a broad distribution of rubber particle sizes. This hypothesis is consistent with that proffered to explain the boost in impact strength of the block copolymer used as a pro-modifier. It is appreciated that distribution of rubber particle sizes over a wide range, by itself, does not offer a satisfactory explanation for the excellent processability of CPVC modified with the block copolymer, and it may be that unidentified physico-chemical effects peculiar to the block copolymer play an essential role. The fact remains that the block copolymer produces impact strength and processability which is demonstrably far greater than one might expect for so small (low wt %) a contribution of rubber. For example by replacing from 20% to about 40% by wt of the rubber from a graft copolymer co-modifier, with rubber (butadiene) from an SB or SBS co-modifier, an unexpected boost in impact strength is obtained. It appears that the separate particles of block copolymer and graft copolymer, in conjunction with their chemical affinity to form large agglomerates, in addition to a wide size range of others, accounts for the special effects attributable to the block copolymer.

Suitable graft copolymers are those conventionally used as impact modifiers for vinyl chloride polymers, and for the most part, commercially available graft copolymers are preferred. These graft copolymers characteristically have a rubbery center upon which is graft copolymerized a shell of hard resin. The process for polymerization of the rubbery center and subsequent overpolymerization of the hard resin by graft copolymerization, is well known. Typical preferred graft copolymerized impact modifiers used for vinyl chloride polymers are those of the MBS type, commercially available as BTA-III S and BTA III N from Kureha Co.; those of the ABS type, available as Blendex 301 and 311 from Marbon; and those of the PMMA/PBA type, available as KM323B from Rohm & Haas.

In each of the embodiments of the composition of this invention, at impact strain rates, the beneficial effect of the SDS or SD block copolymer is manifested in a lower yield stress (craze initiation) and in an increased elongation to break (plasticity). The net effect, assuming the optimum amount is not exceeded, is that of adding more rubber as co-modifier without actually having done so.

The boost in impact strength attributable to the SDS block copolymer is not a transient effect such as sometimes results from frozen-in effects during rapid cooling. The impact strength and other desirable properties of the composition of this invention persist even after the composition is annealed below its $T_g$. The composition of this invention may be formulated in the same physical manner, utilizing the same equipment, as known conventionally impact-modified chlorinated polyvinyl chloride polymers, but with appropriate changes in the recipes to compensate for the fact that the SDS or SD block copolymers generally soften and hasten fusion of the CPVC ingredients.

It is of great commercial importance that hastening of fusion of CPVC while melt-blending the block copolymer into the CPVC decreases the time required, yet the novel CPVC blend exhibits greater impact strength over a broader temperature range than do conventional CPVC blends.

The invention will be more fully understood and appreciated by the further description of the specific embodiments set forth in the examples which follow. All parts and percentages refer to weight unless otherwise stated.

The following recipes with ingredients as specified, are mechanically blended in a 4" Getty mill for about 4 minutes at about 200° C., and compression-molded at about 215° C. in a laboratory press.

In examples 1-5 set forth herein in Table I hereinbelow, GEON*603×560 CPVC, available from The B. F. Goodrich Company, is master-batched with varying amounts of KRATON 1102 pro-modifier, which is a thermoplastic linear SBS block copolymer available from Shell Chemical Co. GEON 603×560 CPVC contains from about 65.3% to about 65.9% bound chlorine, and has an inherent viscosity in the range from about 0.90 to about 0.95 in cyclohexanone. Each batch of 100 parts of CPVC contains 1.125 parts lubricant, such as MICROTHENE 510 polyethelene; 2.0 parts stabilizer, such as T-31 THERMOLITE stabilizer, which is a dibutyl tin bisisooctylthioglycollate. Each batch is milled at 200° C. for 4 minutes and compression molded into test pieces. The polyethylene lubricant provides lubricity and prevents sticking of the resin to the rolls. A lubricant does not function as a processing aid in that the lubricant does not aid fusion and does not substantially smoothen out or soften the stock. Pigments, such as $TiO_2$ powder in the form of rutile, if added, impart opacity to the blend and serve as a base for coloration. The Izod impact strength value tabulated for each example is the average of six pieces. Samples with no pro-modifier, that is, with zero rubber content, had an impact strength of 0.50±0.1 ft-lb/in.

*Registered U.S. Trademark

TABLE I

| Ex. No. | CPVC matrix Geon 603×560 g | Pro-modifier Kraton 1102 g | Rubber content** phr | Izod impact ft-lb/in | Std. dev. (±S) |
|---|---|---|---|---|---|
| 1 | 100 | 2.0 | 0.0 | 1.1 | 0.09 |
| 2 | 100 | 4.0 | 2.8 | 1.5 | 0.22 |

TABLE I-continued

| Ex. No. | CPVC matrix Geon 603×560 g | Pro-modifier Kraton 1102 g | Rubber content** phr | Izod impact ft-lb/in | Std. dev. (±S) |
|---|---|---|---|---|---|
| 3 | 100 | 6.0 | 4.0 | 4.6 | 0.90 |
| 4 | 100 | 8.0 | 5.3 | 6.3 | 0.90 |
| 5 | 100 | 10.0 | 6.5 | 4.0 | 0.60 |

**computed on the basis of Kraton 1102 containing 72% rubber.

The foregoing data demonstrates that the block copolymer promodifier produces a several-fold improvement in the impact strength of unmodified CPVC. These data are plotted in FIG. 1 of the drawing, the parts of SBS per hundred parts resin along the abcissa, and impact strength along the ordinate. The curve indicates that a maximum impact strength is obtained at about 8 phr SBS for those test samples.

The following recipes yield CPVC compositions which demonstrate that a wide variety of commercially available block copolymers are excellent promodifiers, imparting substantially better impact strength than chlorinated polyethylene (CPE) which is the only known dual function modifier capable of providing acceptable melt-blended CPVC. The pro-modifiers used in compositions tested in Table II hereinbelow are identified as follows: Chlorinated Polyethlene (CPE) used in Ex. 14 is available as LD-963 from duPont. KRATON* 1101 Linear triblock SBS copolymer, 70% butadiene (Shell) SOLPRENE* 406 radial block SBS copolymer, 60% butadiene (Phillips) SOLPRENE* 414 radial block SBS copolymer, 60% butadiene (Phillips) SOLPRENE* 416 radial block SBS copolymer, 70% butadiene (Phillips) SOLPRENE* 422 radial block SBS copolymer, 80% butadiene (Phillips) SOLPRENE* 1205 linear diblock SB copolymer, 75% butadiene (Phillips)

Each batch is formulated wih 100 parts GEON* 605×560 CPVC and a small amount, less than 10 parts of pro-modifier which are melt-blended with 1 part MICROTHENE* 510 and 2.0 partsT-31 THERMOLITE* stabilizer. GEON* 605×560 CPVC contains about 65.7% bound chlorine and has an inherent viscosity of about 0.69 in cyclohexanone. Each batch is milled at 200° C. for 2 minutes and compression molded into test peices. Izod impact strengths tabulated are the averages of six test samples.

*Registered U.S. Trademark

TABLE II

| Ex. No. | CPVC matrix Geon 605×560 g | Pro-modifier identif. & wt. (name ) g | Izod impact ft-lb/in | Std. dev. (±S) |
|---|---|---|---|---|
| 6 | 100 | Kraton1102 6.0 | 1.20 | 0.29 |
| 7 | 100 | Kraton1101 7.5 | 1.64 | 0.47 |
| 8 | 100 | Kraton1101 9.0 | 1.58 | 0.26 |
| 9 | 100 | Solprene406 7.5 | 1.63 | 0.25 |
| 10 | 100 | Solprene414 7.5 | 1.63 | 0.25 |
| 11 | 100 | Solprene416 7.5 | 1.49 | 0.38 |
| 12 | 100 | Solprene422 7.5 | 2.15 | 0.60 |
| 13 | 100 | Solprene1205 7.5 | 2.02 | 0.32 |
| 14 | 100 | CPE, LD-963 7.5 | 0.69 | 0.13 |

In the following recipes, mixed linear and radial pro-modifiers are used to provide a CPVC with tailored impact and processability characteristics. (All batches are formulated with 100 parts GEON* 603×560 CPVC which is meltblended on a mill with the pro-modifier, 1.125 parts MICROTHENE* 510 lubricant and 2.0 parts T-31 THERMOLITE* stabilizer.) As will be evident from the data in Table III hereinbelow, longer milling conditions at higher temperatures seriously impair impact strength. This appears to be clearly evident for individual linear triblocks, and also for individual radial blocks of SBS. When the linear and radial blocks are mixed, the effect of the higher temperature milling for longer time is less noticeable. As in the foregoing examples, Izod impact strength values tabulated are the average of six compression molded test samples.

*Registered U.S. Trademark

TABLE III

| Ex. No. | Pro-modifier identification | Pro-modifier weight g | Milling Temp. °C. | Milling Time min | Izod impact ft-lb/in | Std. Dev. (+S) |
|---|---|---|---|---|---|---|
| 15 | Kraton*1101 | 6 | 200 | 2 | 7.0 | 1.3 |
| 16 | Kraton*1101 | 6 | 220 | 4 | 3.0 | 0.3 |
| 17 | Kraton*1102 | 6 | 200 | 2 | 3.8 | 1.5 |
| 18 | Kraton*1102 | 6 | 220 | 4 | 2.7 | 0.4 |
| 19 | Solprene*416 | 6 | 220 | 2 | 8.7 | 1.1 |
| 20 | Solprene*416 | 6 | 220 | 4 | 1.8 | 0.2 |
| 21 | Solprene*422 | 6 | 220 | 4 | 1.1 | 0.2 |
| 23 | Kraton*1102 & Solprene*416 | 4 2 | 200 | 2 | 7.5 | 0.8 |
| 24 | Kraton*1102 & Solprene*416 | 4 2 | 220 | 4 | 5.7 | 1.1 |

*Registered U.S. Trademark

In the following recipes a thermoplastic linear triblock SBS block copolymer available as KRATON 1102 from Shell Chemical Co. is compared, on an equal weight basis, with LD-963 solution chlorinated CPE available from duPont and an MBS type co-modifier available as BTAIIIN available from Kureha Co. Each batch was mixed on a 6 in diameter mill using 500 g of CPVC, with 30 g of comodifier, 5.63 g of polyethylene lubricant and 10 g of a tin stabilizer. All batches were blended at 205° C., roll temperature, for 5 minutes after banding.

The melt index of each batch is measured with a Monsanto Capillary Rheometer. The lower the value, the poorer is the flow of extruded melt. Higher values indicate good flow of extruded melt, and good flow directly results in a time saving when formulating a master batch.

Mill shrinkage is a reflection of melt elasticity and is evidenced by lateral and longitudinal shrinkage of a melt-blended section of sheet as soon as the section is cut from stock on the mill, and allowed to cool.

The heat distortion temperature (HDT) is measured at 264 psi utilizing 0.125 in thick samples. It will be evident that the inclusion of pro-modifier in the CPVC does not significantly after the HDT of a conventional CPVC composition.

The values tabulated for Izod impact of samples molded from various recipes set forth in Table IV hereinbelow, are average values of six compression molded samples, and all failures were of the ductile type.

TABLE IV

| Ex. No. | Modifier Identification | Melt Index | Mill Shrinkage % | HDT °C. | Izod impact ft-lb/in |
|---|---|---|---|---|---|
| 25 | CPE | 0.5075 | 13 | 103.5 | 4.20 |
| 26 | BTAIIIN | 0.1882 | 12 | 102.5 | 3.93 |
| 27 | Kraton 1102 | 0.4553 | 9 | 105.0 | 6.25 |

The foregoing results show that CPVC with Kraton 1102 pro-modifier has essentially the same HDT as CPVC with either CPE or BTAIIIN, but the mill shrinkage and impact strength of CPVC with Kraton 1102 are each better than that of either of the other compositions, and the melt index of CPVC with Kraton 1102 is close to that of CPVC with CPE.

In a manner analogous to that in which each of the batches of examples 25-27 are blended, additional batches having the same compositions are prepared except that the blending time after banding on 205° C. rolls is limited to 2 min, which is one-half the blending time provided in the aforementioned examples. Some of the physical properties of the batches blended for only 2 min are set forth in Table V hereinbelow.

TABLE V

| Ex. No. | Modifier Identification | Melt Index | Mill Shrinkage % | HDT °C. | Izod impact ft-lb/in |
|---|---|---|---|---|---|
| 28 | CPE | 0.4456 | 10.4 | 106.5 | 2.70 |
| 29 | BTAIIIN | 0.1649 | 13.0 | 105.5 | 3.28 |
| 30 | Kraton1102 | 1.3592 | 8.4 | 105.5 | 5.87 |

The foregoing results show that CPVC with Kraton 1102 pro-modifier, melt-blended for 2 min. at 205° C. roll temperature, has essentially the same HDT as CPVC with either CPE or BTAIIIN, but the melt index, mill shrinkage and impact strength of CPVC with Kraton 1102 are each better than that of either of the other compositions. It is especially noteworthy and surprising that the melt index of CPVC with kraton 1102 is much better than that of CPVC with CPE with the shorter blending time. Clearly, the particular conditions of processing CPVC and pro-modifier to yield the composition of this invention, affects the physical properties of the composition. The most desirable processing conditions for a particular pro-modified CPVC may be obtained by simple trial and error. It is presumed that the processing conditions affect the degree of dispersion as well as the particle size distribution of the pro-modifier in the CPVC matrix, and neither is predictable.

The foregoing examples illustrate the effect of an SB or SBS block copolymer, or mixtures thereof, as the sole pro-modifier in CPVC. As has been stated hereinabove, an SBS or SB pro-modifier may be used as a co-modifier in combination with conventional impact modifiers to tailor the physical properties of the modified CPVC composition. Though the effect of block co-polymer in such a combination varies widely depending upon the type of block co-polymer chosen, the impact strength of the combination of co-modifiers, when evaluated on the basis of their rubber content (% by wt), is greater than the impact strength attributable to the same rubber content in a conventional grafted co-modifier. Such an unexpected improvement in impact strength is also otained when CPVC is comodified with a combination of SB or SBS block co-polymer co-modifier, and a CPE co-modifier which is an ungrafted impact modifier.

In the following examples 31-34 set forth in Table VI hereinbelow, GEON 603×560 CPVC is compounded to contain 6.0% by wt total rubber. In example 31, only BTAIIIN, which is an MBS type of graft co-polymer, is used as the co-modifier. In example 34, only Kraton 1102 which is a thermoplastic SBS linear block copolymer, is used as the co-modifier. In examples 32 and 33 each co-modifier contributes a portion of the rubber content. As in the previous examples, each batch is compounded with MICROTHENE polyethylene lubricant (0.5 phr), THERMOLITE T-31 stabilizer (2.5 phr), and some finely divided filler such as TiO$_2$, preferably in the uncoated rutile form. The components are melt-blended between 205° C. rolls for 2 min after banding. The values tabulated for Izod impact strength are the average values of six samples compression molded at 210° C.

TABLE VI

| Ex. No. | CPVC matrix GEOn 603×560 g | Co-modifier BTAIIIN g | Co-modifier Kraton 1102 g | Izod impact ft-lb/in | Std. dev. (±S) | % rubber from SBS |
|---|---|---|---|---|---|---|
| 31 | 100 | 8.5 | 0.0 | 2.5 | 0.4 | 0.0 |
| 32 | 99.5 | 4.2 | 4.8 | 9.6 | 1.6 | 25.0 |
| 33 | 99.2 | 2.1 | 7.2 | 3.3 | 0.6 | 75.0 |
| 34 | 98.9 | 0.0 | 9.6 | 1.9 | 0.3 | 100.0 |

Figure 2:
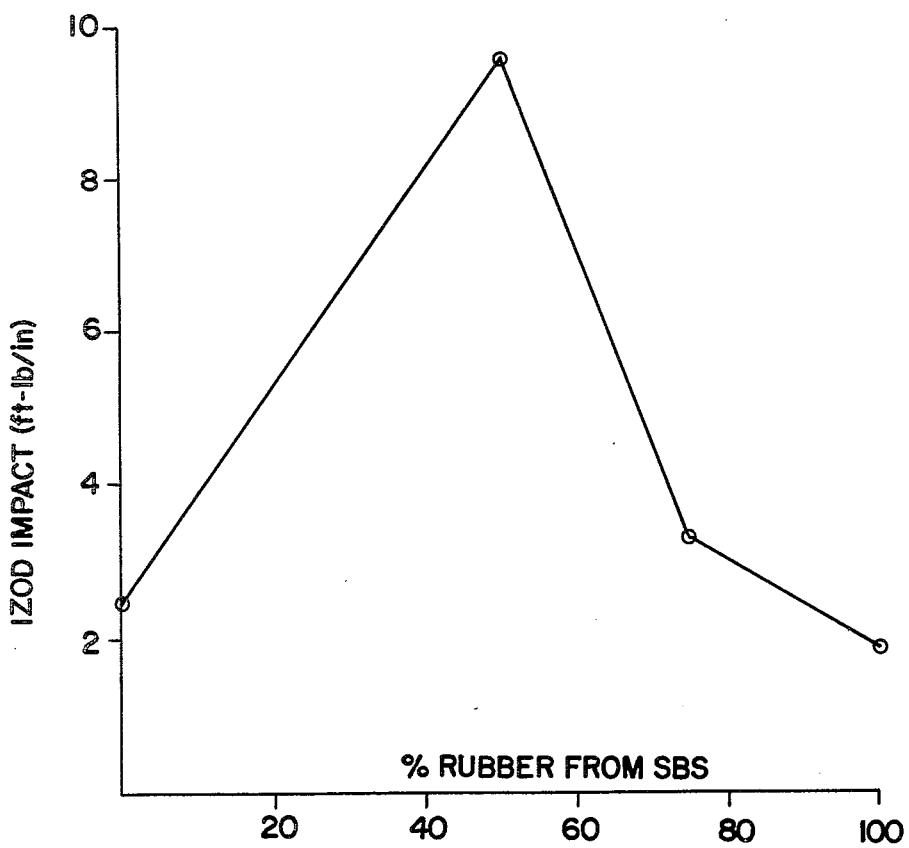
FIG. 2 graphically illustrates the effect on impact strength of SBS pro-modifier according to its contribution of rubber in the composition, and shows the synergistic effect of that contribution.

The foregoing results show that the impact strength is higher when the rubber content of the composition is contributed by each co-modifier, rather than by either one by itself. FIG. 2 is a plot of Izod impact strength for the samples tested, the results of which are tabulated in Table VI hereinabove, showing graphically the synergistic effect of the contribution of rubber from SBS to the impact strength of the molded test strips.

In a manner analogous to that in which each of the batches of Examples 31–34 are melt-blended, GEON 603×560 CPVC is modified individually and conjointly with KRATON 1102 SBS linear block co-polymer and an ungrafted CPE are melt-blended individually and cojointly as co-modifiers, and the results obtained are set forth in Table VIII hereinbelow. Each batch is formulated by melt-blending about 100 g (adjusted as stated) of GEON 603×560 CPVC and enough co-modifier(s) to provide 4 phr rubber in the composition. When KRO-3 SBS block copolymer is mixed with CPE the rubber content is maintained at 4 phr, and the % of rubber contributed by the SBS block copolymer is recorded. Additionally, each batch includes MICROTHENE polyethylene lubricant (1.5 g), THERMOLITE T-31 stabilizer (2.5 g) and TiO$_2$ filler (5.0 g). The components are melt-blended between 205° C. rolls for 2 min after banding. The values tabulated for Izod impact strength are the average values of six samples compression molded at 210° C.

TABLE VIII

| Ex. No. | CPVC matrix GEON603×560 | Co-modifier CPE | Co-modifier KRO-3 | Rubber from SBS | Izod impact | Std. (±S) |
|---|---|---|---|---|---|---|
| 40 | 100 | 4.0 | 0.0 | 0.0 | 0.58 | 0.20 |
| 41 | 98.3 | 3.5 | 2.2 | 12.5 | 0.78 | 0.19 |
| 42 | 96.6 | 3.0 | 4.4 | 25.0 | 1.50 | 0.13 |
| 43 | 95.0 | 2.5 | 6.5 | 37.5 | 1.21 | 0.34 |

KM323B which is a grafted PMMA/PBA type (66% polybutyl acrylate rubber coated with polymethyl/methacrylate) of co-polymer available from Rohm & Haas. Each batch is formulated by melt-blending 100 g GEON 603×560 CPVC with MICROTHENE polyethylene lubricant (1.5 g), THERMOLITE T-31 stabilizer (2.0 g) and TiO$_2$ uncoated rutile (2.0 g). The components are melt-blended between 210° C. rolls for 2 min after banding. The values tabulated for Izod impact strength are the average values of six samples compression molded at 210° C. The results obtained are set forth in Table VII hereinbelow.

TABLE VII

| Ex. No. | CPVC matrix GEON 603×560 g | Co-modifier KM323B g | Co-modifier Kraton1102 g | Izod impact ft-lb/in | Std. dev. (±S) |
|---|---|---|---|---|---|
| 35 | 100 | 4 | 0 | 0.79 | 0.23 |
| 36 | 100 | 3 | 1 | 1.27 | 0.18 |
| 37 | 100 | 2 | 2 | 1.41 | 0.12 |
| 38 | 100 | 1 | 3 | 1.74 | 0.26 |
| 39 | 100 | 0 | 4 | 1.94 | 0.33 |

In a manner analogous to that in which each of the batches of Examples 35–39 are blended, KRO-3 polymer which is a plastic radial SBS block copolymer and In a manner analogous to that in which each of the batches of examples 40–43 are blended, additional batches are formulated except that the rubber content is maintained at 6 phr. The results are set forth in Table IX hereinbelow.

TABLE IX

| Ex. No. | CPVC matrix GEON603×560 g | Co-modifier CPE g | Co-modifier KRO-3 g | Rubber from SBS % | Izod impact ft-lb/in | Std. dev. (±S) |
|---|---|---|---|---|---|---|
| 44 | 100 | 6.0 | 0.0 | 0.0 | 0.85 | 0.19 |
| 45 | 96.6 | 5.0 | 4.4 | 17. | 1.77 | 0.38 |
| 46 | 93.3 | 4.0 | 8.7 | 33. | 1.06 | 0.47 |
| 47 | 90.0 | 3.0 | 13.1 | 50. | 0.64 | 0.09 |

In a manner analogous to that in which each of the batches of Examples 35–39 hereinabove are blended, 5 phr Kraton 1102 polymer, which is a linear block SBS copolymer, is combined for its effect, with various levels of Zerlon (Registered U.S. Trademark) 150-Z27 modifier. Zerlon in not a conventional impact modifier as it contains no rubber, but it is methyl methacrylate/styrene (65/35) copolymer available from Dow Chemical Co. Lubricant and stabilizer are added as above, and the components melt-blended between 200° C. rolls for 120 sec after banding. Test pieces are compression molded at 210° C., and the values set forth are the averages for six samples.

TABLE X

| Ex. No. | CPVC matrix GEON 603×560 g | Pro-modifier Kraton 1102 g | Co-modifier Zerlon 150-Z27 g | Izod impact ft-lb/in | Std. dev (±S) |
|---|---|---|---|---|---|
| 48 | 100 | 5 | 0 | 2.70 | 0.34 |

TABLE X-continued

| Ex. No. | CPVC matrix GEON 603×560 g | Pro-modifier Kraton 1102 g | Co-modifier Zerlon 150-Z27 g | Izod impact ft-lb/in | Std. dev (±S) |
| --- | --- | --- | --- | --- | --- |
| 49 | 97 | 5 | 3 | 3.10 | 1.0 |
| 50 | 94 | 5 | 6 | 2.42 | 0.38 |
| 51 | 91 | 5 | 9 | 1.85 | 0.39 |

In any of the foregoing examples, SB diblock or SBS polyblock copolymers, whether linear or radial, may be used in mixed form or individually. When mixed, the ratio of diblock to SBS polyblock, or the ratio of SBS linear polyblock to radial polyblock, or the ratio of any combinations thereof, may be varied to produce a resin of desirable optical and other physical characteristics amongst which impact strength may be tailored for a particular purpose. Similarly, more than one co-modifier may be used in combination with a SB or SBS block copolymer modifier in which the particle sizes and molecular weights are varied, allowing an additional degree of latitude in tailoring a resin for further desirable physical characteristics and desired impact performance.

I claim:

1. A normally rigid thermoplastic composition comprising (a) a matrix comprising a chlorinated vinyl chloride resin, and (b) a dual function processing aid and impact modifier, or pro-modifier, consisting essentially of a block copolymer of a vinyl aromatic compound (S) and a conjugated diene (D), wherein said vinyl aromatic compound (S) is selected from the group consisting of styrene, α-methyl styrene, vinyl toluene, vinyl xylene, and naphthalene, said conjugated diene (D) is selected from the group consisting of butadiene, isoprene, 1,3-pentadiene, and 2,3-dimethyl butadiene, and said pro-modifier is present in an amount in the range from about 1 percent to about 10 percent by weight based on the total resinous components of said composition.

2. The composition of claim 1 wherein said chlorinated vinyl chloride resin is selected from the group consisting of copolymers of chlorinated vinyl chloride and a homopolymer of chlorinated vinyl chloride.

3. The composition of claim 2 wherein said homopolymer of chlorinated vinyl chloride has at least 60% by weight chemically bound chlorine.

4. The composition of claim 3 wherein said pro-modifier is present in an amount in the range from about 2 percent to about 8 percent by weight.

5. The composition of claim 4 wherein said block copolymer pro-modifier has a structure selected from a polyblock structure including a linear diblock, linear triblock, and a radial teleblock structure.

6. The composition of claim 5 wherein said chlorinated vinyl chloride polymer has primary resin particles in the size range from about 2500 Å to about 2μ (microns), and said block copolymer pro-modifier has primary particles in the size range from about 200 Å to about 1μ.

7. The composition of claim 6 wherein said pro-modifier includes vinyl aromatic compound units which comprise from about 20 to about 80 percent by weight of said block copolymer pro-modifier.

8. The composition of claim 5, including in addition, at least one conventional impact modifier, or co-modifier, selected from the group consisting of an ungrafted chlorinated polyethylene and a grafted interpolymerization product of a hard resin and a rubbery polymer, wherein said hard resin is derived from a monounsaturated monomer, said pro-modifier and said conventional impact modifier being co-modifiers in said composition.

9. The composition of claim 8 wherein said matrix is present in an amount in excess of about 85 percent by weight of the total resinous components in said composition and said co-modifiers together provide less than 10 parts rubber per 100 parts resinous components in said composition.

10. The composition of claim 8 wherein each said co-modifier is present in an amount less than about 10% by weight of the total resinous components.

11. The composition of claim 10 wherein said conventional impact modifier is selected from the group consisting of graft copolymerized impact modifiers of the MBS type, the ABS type and the PMMA/PBA type.

12. The composition of claim 7 including in addition, a minor quantity in the range from about 1% to about 20% by weight of an interpolymer having no rubber content.

13. The composition of claim 12 wherein said interpolymer is selected from the group consisting of copolymers of an alkyl methacrylate and styrene, and homopolymers and copolymers of vinyl chloride.

14. A reinforced composition as defined in claim 1 including a reinforcing amount of fibrous glass.

15. A reinforced composition as defined in claim 8 including a reinforcing amount of fibrous glass.

16. A method for preparing a normally rigid thermoplastic article comprising melt-blending (a) a chlorinated vinyl chloride resin having at least 60% by weight bound chlorine, and (b) a block copolymer pro-modifier consisting essentially of a block copolymer of a vinyl aromatic compound (S) and a conjugated diene (D), wherein said vinyl aromatic compound (S) is selected from the group consisting of styrene, alpha-methyl styrene, vinyl toluene, vinyl xylene, and vinyl naphthalene, said conjugated diene (D) is selected from the group consisting of butadiene, isoprene, 1,2-pentadiene, and 2,3-dimethyl butadiene, and wherein said block copolymer pro-modifier is present in an amount in the range from about 1 percent to about 10 percent by weight, based on the total resinous components of said composition, to obtain a uniform melt; and, shaping said melt to form said article.

17. The method of claim 16 comprising in addition, melt-blending into said melt at least one conventional impact modifier selected from the group consisting of an ungrafted chlorinated polyethylene and a grafted interpolymerization product of a hard resin and a rubbery polymer, wherein said hard resin is derived from a mono-unsaturated monomer, said pro-modifier and conventional impact modifier being co-modifiers in said composition.

18. The method of claim 16 comprising in addition, melt-blending into said melt a minor quantity by weight of a synthetic resinous interpolymer containing no rubbery polymer.

* * * * *